US012525741B2

(12) United States Patent
Chen et al.

(10) Patent No.: US 12,525,741 B2
(45) Date of Patent: Jan. 13, 2026

(54) ELECTRONIC PORT HAVING A LOCKING ASSEMBLY TO LOCK AN ELECTRONIC PLUG

(71) Applicant: HEWLETT PACKARD ENTERPRISE DEVELOPMENT LP, Spring, TX (US)

(72) Inventors: Yuying Chen, Beijing (CN); Yuhai Guo, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 383 days.

(21) Appl. No.: 18/360,062

(22) Filed: Jul. 27, 2023

(65) Prior Publication Data

US 2025/0038454 A1 Jan. 30, 2025

(51) Int. Cl.
*H01R 13/629* (2006.01)
*H01R 12/71* (2011.01)
*H01R 13/627* (2006.01)
*H01R 43/26* (2006.01)

(52) U.S. Cl.
CPC ......... *H01R 13/629* (2013.01); *H01R 12/716* (2013.01); *H01R 13/6273* (2013.01); *H01R 43/26* (2013.01)

(58) Field of Classification Search
CPC ................ H01R 13/629; H01R 12/716; H01R 13/6273; H01R 43/26; H01R 12/72; H01R 13/639; G06F 1/16; G06F 1/181
See application file for complete search history.

(56) References Cited

U.S. PATENT DOCUMENTS

| | | | | |
|---|---|---|---|---|
| 11,527,851 B2* | 12/2022 | Nguyen | H01R 43/26 | |
| 12,057,659 B2* | 8/2024 | Chen | H01R 13/639 | |
| 2010/0317215 A1* | 12/2010 | Chang | H01R 13/70 | 439/304 |
| 2011/0008986 A1* | 1/2011 | Thom | H01R 13/62933 | 439/347 |
| 2022/0311187 A1* | 9/2022 | Nguyen | H01R 13/639 | |
| 2023/0034099 A1* | 2/2023 | Chen | H01R 13/639 | |
| 2025/0038454 A1* | 1/2025 | Chen | H01R 12/716 | |

* cited by examiner

*Primary Examiner* — Abdullah A Riyami
*Assistant Examiner* — Nader J Alhawamdeh
(74) *Attorney, Agent, or Firm* — Hewlett Packard Enterprise Patent Department

(57) ABSTRACT

Electronic port includes a receptacle and a locking assembly having a clamping module and a fastener. The receptacle includes first, and second retainer members being configured to releasably hold a connector of an electronic plug. The clamping module includes a first clamp member having first engagement members, and a second clamp member movably coupled to the first clamp member and having second engagement members, the first and second engagement members are aligned with the first and second retainer members. The fastener is movably coupled to the clamping module to transition the clamping module between fastened and unfastened states by moving the first and/or second clamp members relative to the receptacle. In the unfastened state, the first and second retainer members are allowed to release the connector, and in the fastened state, the first and second engagement members engage the first and second retainer members and prevent from releasing the connector.

20 Claims, 9 Drawing Sheets

FIG. 2B
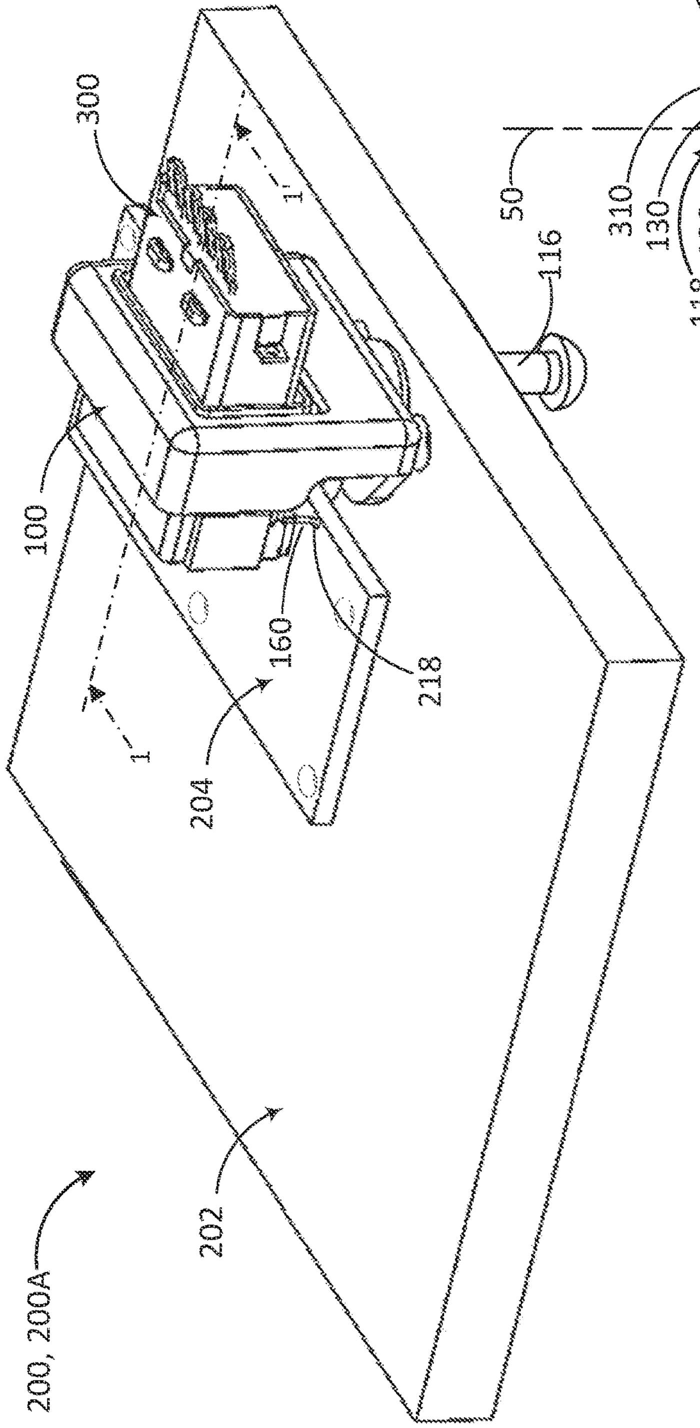
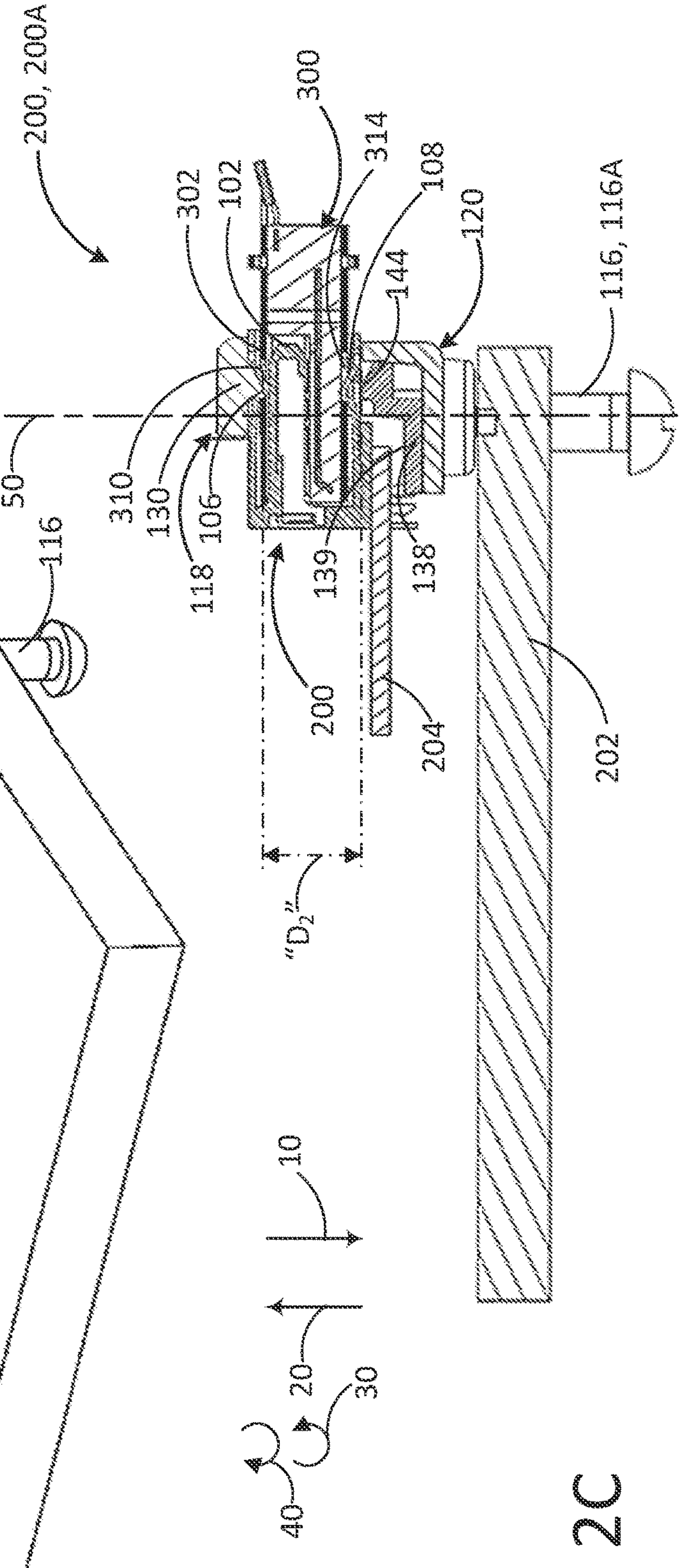
FIG. 2C

ELECTRONIC PORT HAVING A LOCKING ASSEMBLY TO LOCK AN ELECTRONIC PLUG

BACKGROUND

Electronic devices, such as servers, storages, access points, or the like may include one or more electronic Input-Output (IO) ports, e.g., universal serial bus (USB) ports. In such examples, a removable electronic module having a USB plug may be connected to the electronic device via the USB port for storing, processing, receiving, transferring data, or the like. As the USB plugs are configured to be removable from the USB ports in a "plug and play" manner, the USB ports may have a standardized connection interface for the USB plugs.

BRIEF DESCRIPTION OF THE DRAWINGS

Various examples will be described below with reference to the following figures.

FIG. 2B illustrates an assembled perspective view of the electronic device of FIG. 2A having the electronic plug connected to the electronic port maintained in an unfastened state according to an example of the present disclosure.

FIG. 2C illustrates a cross-sectional view of the electronic device of FIG. 2B taken along line 1-1' in FIG. 2B according to an example of the present disclosure.

DETAILED DESCRIPTION

Figure 1B:
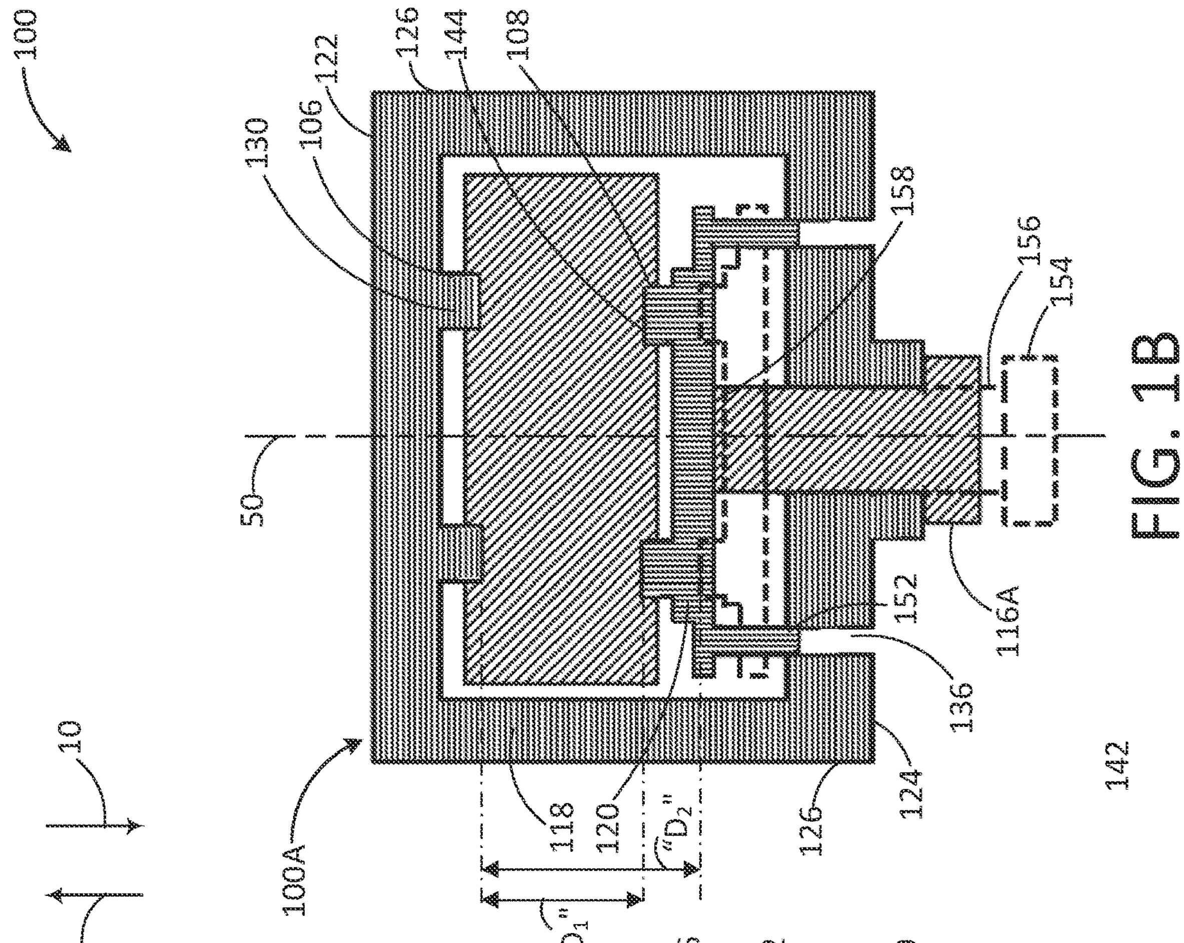
FIG. 1B illustrates the block diagram of the electronic port of FIG. 1A transitioned to a fastened state from the unfastened state according to an example of the present disclosure.

The following detailed description refers to the accompanying drawings. For purposes of explanation, certain examples are described with reference to the components illustrated in FIGS. 1-6. The functionality of the illustrated components may overlap, however, and may be present in a fewer or greater number of elements and components. Moreover, the disclosed examples may be implemented in various environments and are not limited to the illustrated examples. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Electronic plugs and ports, such as USB plugs and ports, may be used to connect a communication cable to an electronic device. This communication cable may then connect to some other device, thus forming a communication and/or power delivery channel between the first electronic device and the other electronic device. In addition to communication cables, such electronic plugs and ports can also be used to connect a removable electronic module, e.g., a cellular modem, a dongle, or the like, directly to the electronic device without necessarily requiring a cable to extend therebetween. The removable electronic module may be added to the electronic device, e.g., an access point, for performing intended functions such as, for example, connecting to the internet, updating firmware, providing low power charging, or the like. The communication cable or the removable electronic module may be connected to the electronic device by way of plugging the plug of the cable or module into the port. Similarly, the communication cable or the removable electronic module may be disconnected from the electronic device by way of unplugged the plug from the port.

Generally, such plugs and ports are designed to be relatively easily mated and unmated to allow for easy installation/removal. The plugs and ports may have retention mechanisms designed to hold them together once mated, but usually these retention mechanisms apply relatively small forces that are intended primarily to prevent accidental disconnection (e.g., to prevent gravity from pulling the plug out of the port) but these forces are usually small enough to be relatively easily overcome when a user actively pulls on the plug to remove it from of the port. For example, a USB port may include retention features that include spring fingers with detents that engage with recesses/apertures in the USB plug such that insertion or removal of the USB plug requires displacement (bending) of the spring fingers; thus, the amount of force needed to remove the USB plug is proportional to the spring force of the spring fingers.

Accordingly, the plug of the communication cable or the removable electronic module may be removed from the port of the electronic device as easily as it would be to connect the plug to the port. Hence, the communication cable or removable electronic modules may be susceptible to accidental or erroneous removal, which may disrupt operations of the device. For example, when a technician is servicing a networking device with many plugs inserted, the technician may unplug one plug which should not be unplugged, thinking that it is another plug. In addition to accidental/erroneous removal, valuable removable electronic modules may also be an attractive and easy target for theft from the electronic devices.

Some previous approaches to securing plugs to ports include latch elements that are added to the plug, and which engage with the port to prevent removal unless a user actuates the latch (e.g., by pressing a button). While these approaches can reduce accidental removals by making the user intentionally press the button to remove the plug, these approaches do not address the issues of intentional-but-erroneous removals or theft, as a person can still quickly and easily remove the plug if they desire. Other previous approaches to secure the removable electronic module include using an external locking mechanism to secure the removable electronic module to some fixed elements of the electronic device (such as a locked box surrounding the removable electronic module and anchored to a chassis of the electronic device). However, such external locking mechanism may complicate an authorized removal of the removable electronic module from the electronic device. Additionally, the external locking mechanism used to secure multiple removable electronic modules in the datacenter environment may be a complicated and tedious process. Further, the external locking mechanisms are typically bulky in nature, thus making it difficult to use such locking mechanisms in electronic devices having space constraints. Accordingly, the external locking mechanisms used to secure the removable electronic module to the electronic device may be cumbersome or may not be cost effective.

A technical solution to the aforementioned problems may include providing a locking assembly that has clamping members disposed around the port and configured to engage with opposite sides of a receptacle of an electronic port to clamp down on the port and prevent release of a connector of an electronic plug from the receptacle, in an installed state of the electronic plug to the electronic port. Accordingly, when a cable or a removable electronic module (such as a cellular modem) having the electronic plug (e.g., a USB plug) is installed or connected to the electronic port (e.g., a USB port) of an electronic device (such as an access point), the locking assembly may engage with the receptacle to prevent release of the plug from the port. Moreover, as described in greater detail below, the locking assembly may be contained primarily (or entirely) within the envelope of the electronic device, thus avoiding the issues that may result from the bulky nature of the aforementioned external locking mechanisms. In addition, the locking assembly may effectively deter many thefts because, unlike a simple button on the plug, it may require specialized knowledge of how to release the device (which a thief may not have). Moreover, even if a potential thief has knowledge of how to release the locking mechanism, releasing the mechanism may require tools and may take some time (unlike pressing a simple button on the plug), and this may further deter some thefts (e.g., thefts of opportunity). (Of course, no security solution can prevent a determined thief with sufficient time and tools, but by making removal more difficult and time consuming, a majority of thefts, which tend to be casual thefts or thefts of opportunity, may be deterred). Furthermore, because in some examples the locking mechanisms does not entail modifications to the plug itself, a manufacturer of the electronic device can implement the locking mechanism in their electronic devices without limiting the compatibility of the electronic device to only certain plugs and without needing to rely on manufacturers of the communications cables or the removable electronic modules to make design changes to their products to enable the locking.

In some examples, the plugs and ports include USB plugs and ports. In these examples, the receptacle may be a standardized component of the USB port, which includes a first set of retainer members on a first face of the receptacle and a second set of retainer members on a second face of the receptacle opposite from the first face. Similarly, the connector may be a standardized component of the USB plug, which includes a first set of notches on a first face of the connector and a second set of notches on a second face of the connector opposite from the first face. In such examples, when the removable electronic module is connected to the electronic device, the first and second sets of retainer members may engage with the first and second sets of notches to releasably hold the connector of the USB plug to the receptacle of the USB port. Since the retainer members of the receptacle is not locked or free to move, the receptacle may release the connector when the electronic plug is pulled out from the electronic port, thereby allowing removal of the removable electronic module from the electronic device. In one or more examples of the present disclosure, a locking assembly may be used to lock the retainer members (or restrict the movement of the retainer members), thereby preventing the removable electronic module from being removed from the electronic device. In some examples, the locking assembly includes a clamping module and a fastener, which may collectively work in tandem to engage with the receptacle and restrict release of the USB plug from the USB port, and thereby prevent theft or accidental removal of the removable electronic module from the electronic device.

In some examples, the clamping module includes a first clamp member having a first set of engagement members, and a second clamp member having a second set of engagement members. The second clamp member is movably coupled to the first clamp member. In some examples, the first clamp member may include a guide structure that engages with the second clamp member to guide motion of the second clamp member along an axis relative to the first clamp member and movably couple the second clamp member to the first clamp member. The first clamp member includes a space to allow the clamping module to surround the receptacle such that the first and second sets of engagement members of the first and second clamp members are disposed on opposite sides of the receptacle and are aligned with the first and second sets of retainer members of the receptacle. Further, the fastener is movably coupled to the clamping module. In particular, the fastener extends through an opening in a wall of the first clamp member and contacts the second clamp member. The fastener, when actuated, may move the clamping module between a fastened state and an unfastened state by moving the first clamp member and/or the second clamp member relative to the receptacle. In some examples, the fastener may include a screw that may be engaged with threads in the opening of the first clamp member, and an end of the screw may contact the second clamp member. In such examples, when the screw is rotated, the screw may drive motion of the first clamp member and/or the second clamp member in response to translation of the screw along a vertical axis of the locking assembly.

In some examples, the fastener is actuated in a first actuation direction to transition the clamping module to the fastened state. As the fastener is actuated along the first actuation direction, the fastener may move the first clamp member along a first direction and/or the second clamp member along a second direction opposite the first direction until the first set of engagement members is engaged with the first set of retainer members, the second set of engagement members is engaged with the second set of retainer members, and the first and second sets of engagement members are separated by a first separation distance. Further, the fastener may be retained in such actuated state to constrain the first and second clamp members to maintain the first separation distance between the first and second sets of engagement members, and thereby prevent the first and second sets of retainer members from moving to release the electronic plug from the electronic port. Further, the fastener is actuated in a second actuation direction to transition the clamping module to the unfastened state. As the fastener is actuated along the second actuation direction, the fastener may move the first clamp member along the second direction and/or the second clamp member along the first direction until the first and second sets of engagement members are separated by a second separation distance, greater than the first separation distance, and thereby allowing the first and second sets of retainer members from moving to release the electronic plug from the electronic port.

Since the engagement members are configured to engage with internal components, e.g., retainer members of the receptacle to prevent the release of the connector of the electronic plug, the locking assembly may occupy substantially less space of the electronic device when compared to an external locking device used for securing the USB plug. Accordingly, the locking assembly having such simple design may be self-contained and does not require additional components external to the USB port, thus allowing the cost to secure the removable electronic module in the electronic device to be substantially low. Further, since both first and second sets of retainer members are engaged by the first and second sets of engagement members of the locking assembly, the amount of force that may be required for a forced removal (or theft) of the removal electronic device from the electronic device may be substantially high, e.g., greater than 130N (which may be more than an average force that a human may apply), thereby securing the USB plug to the USB port.

Figure 1A:
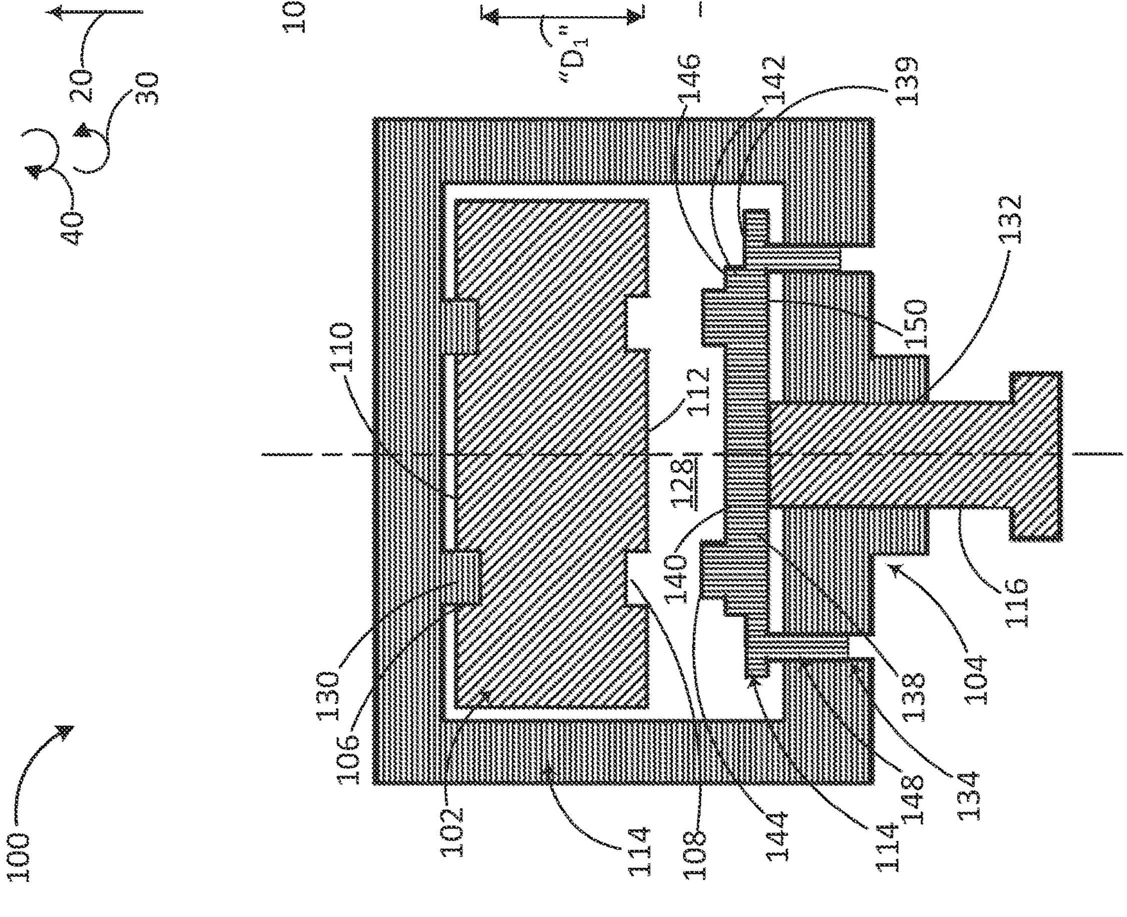
FIG. 1A illustrates a block diagram of an electronic port maintained in an unfastened state according to an example of the present disclosure.

FIG. 1A depicts a block diagram of an electronic port 100 in an unfastened state. FIG. 1B depicts the block diagram of the electronic port 100 of FIG. 1A transitioned to a fastened state. In the description hereinafter, FIGS. 1A-1B are described concurrently for ease of illustration. It should be understood that FIGS. 1A-1B are not intended to illustrate specific shapes, dimensions, or other structural details accurately or to scale, and that implementations of the electronic port 100 may have different numbers and arrangements of the illustrated components and may also include other parts that are not illustrated. In some examples, the electronic port 100 is a universal serial bus (USB) port 100A of an electronic device 200 (see, FIGS. 2A-2C) such as a computer (e.g., a server, a storage device), a networking device (e.g., a switch, access point), or the like. In one or more examples, the electronic port 100 includes a receptacle 102 and a locking assembly 104.

Figure 2A:
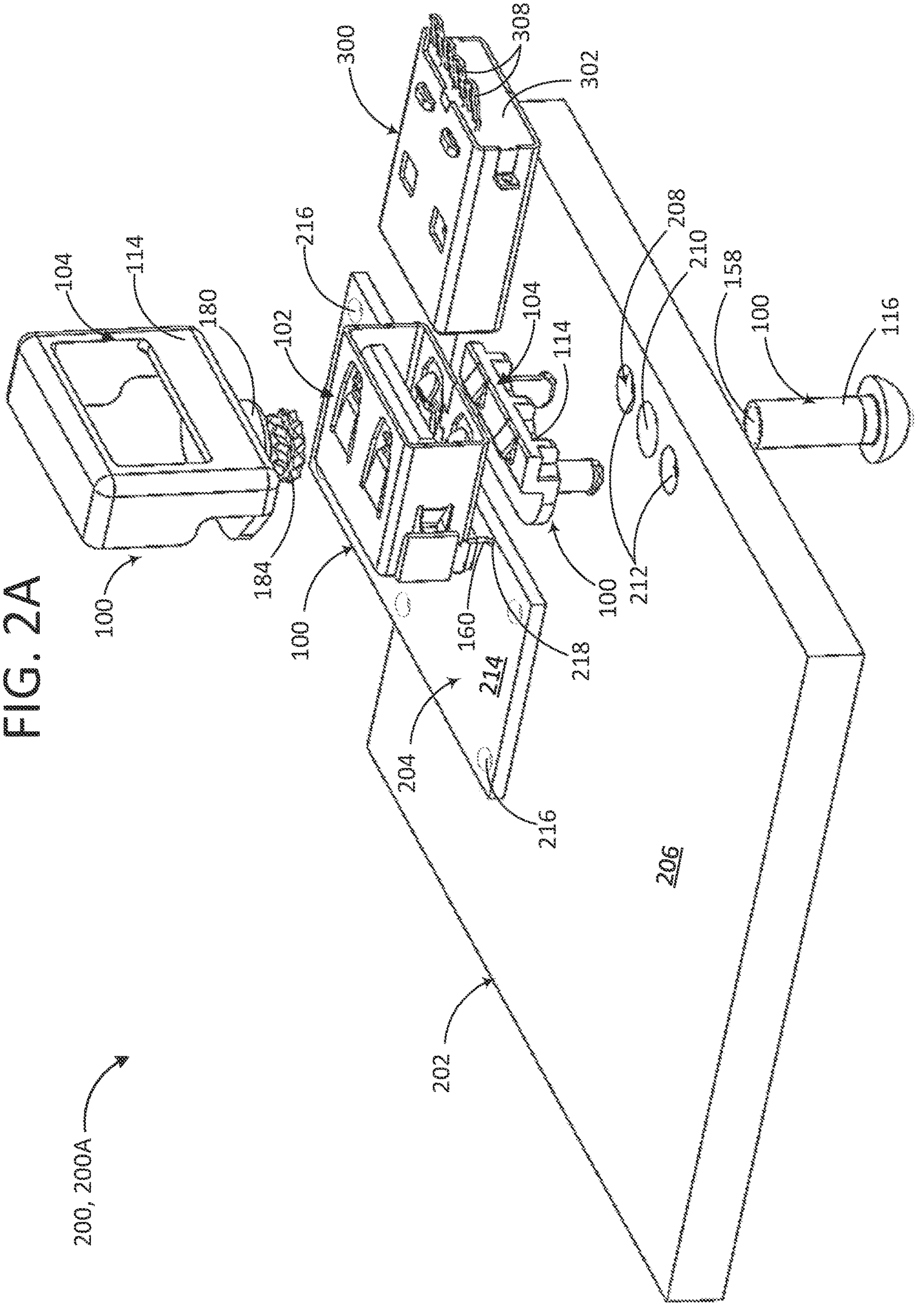
FIG. 2A illustrates an exploded perspective view of an electronic device having an enclosure, a circuit board, an electronic port, and an electronic plug according to an example of the present disclosure.
Figure 3A:
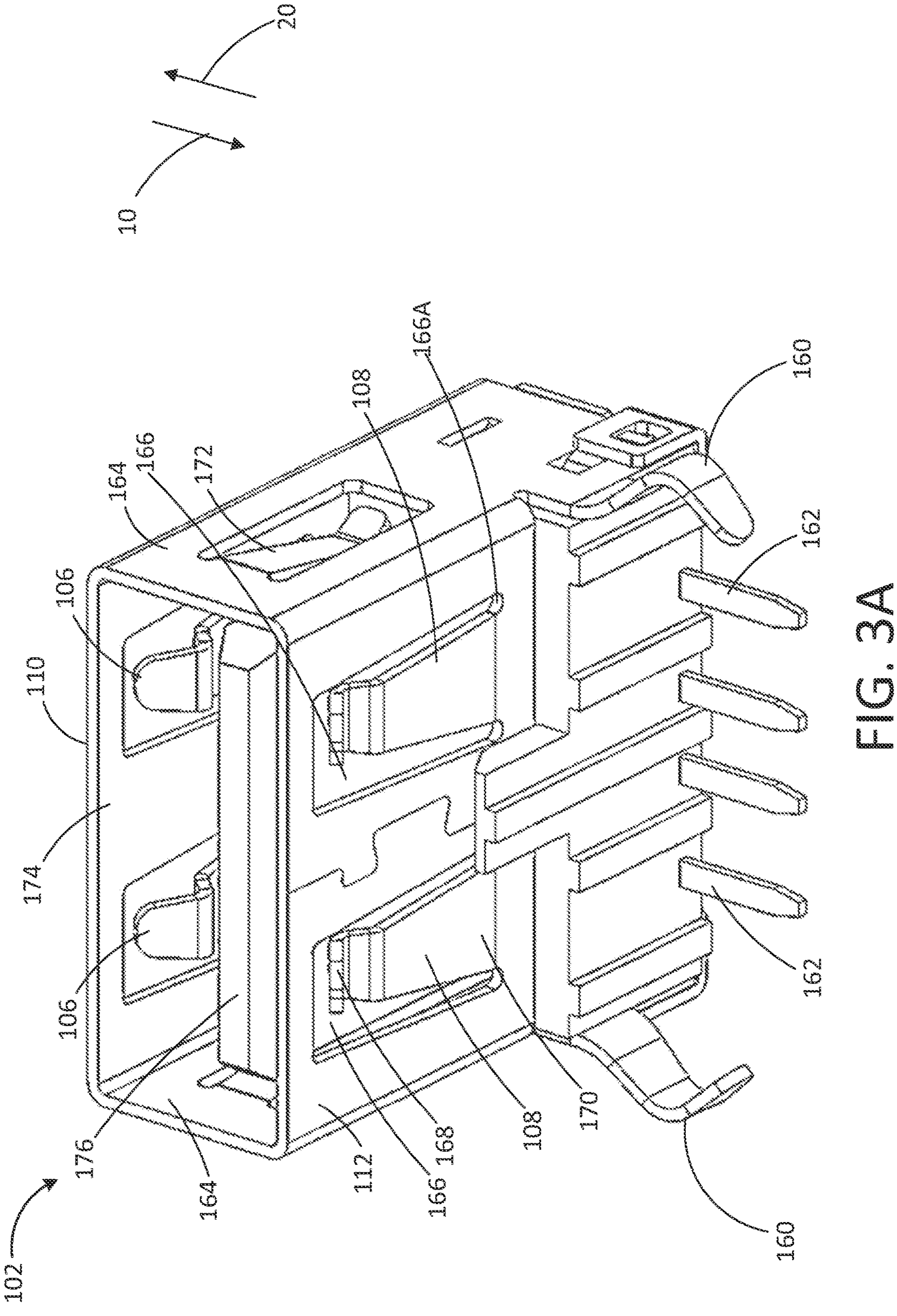
FIG. 3A illustrates an enlarged perspective view of a receptacle of the electronic port of FIG. 2A according to an example of the present disclosure.
Figure 3C:
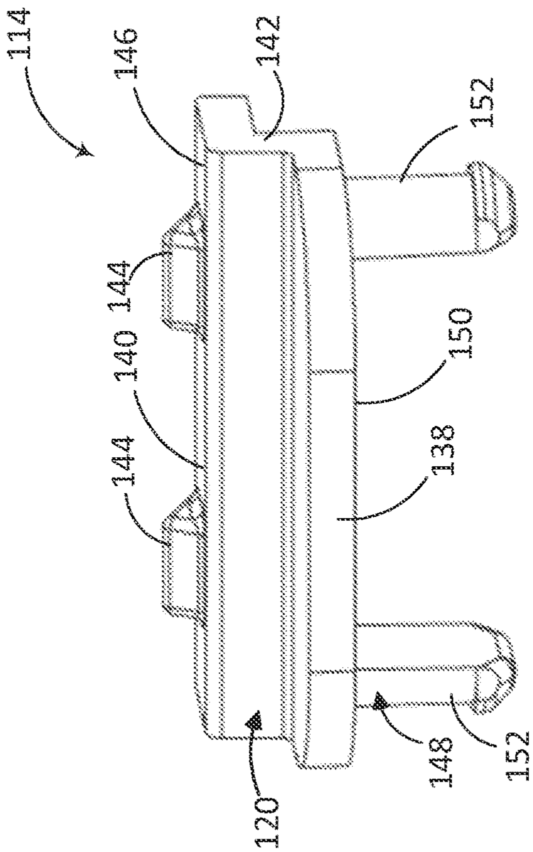
FIG. 3C illustrates an enlarged perspective view of a second clamp member of the electronic port of FIG. 2A according to an example of the present disclosure.
Figure 3B:
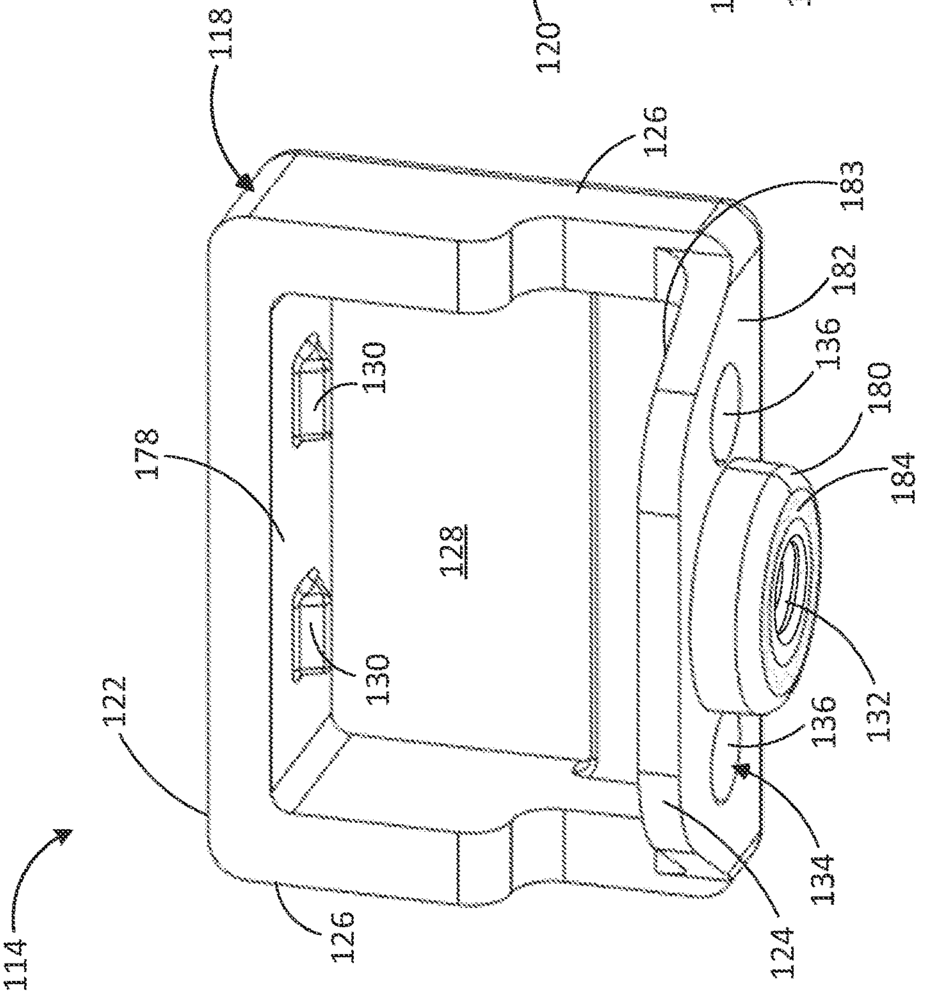
FIG. 3B illustrates an enlarged perspective view of a first clamp member of the electronic port of FIG. 2A according to an example of the present disclosure.
Figure 3D:
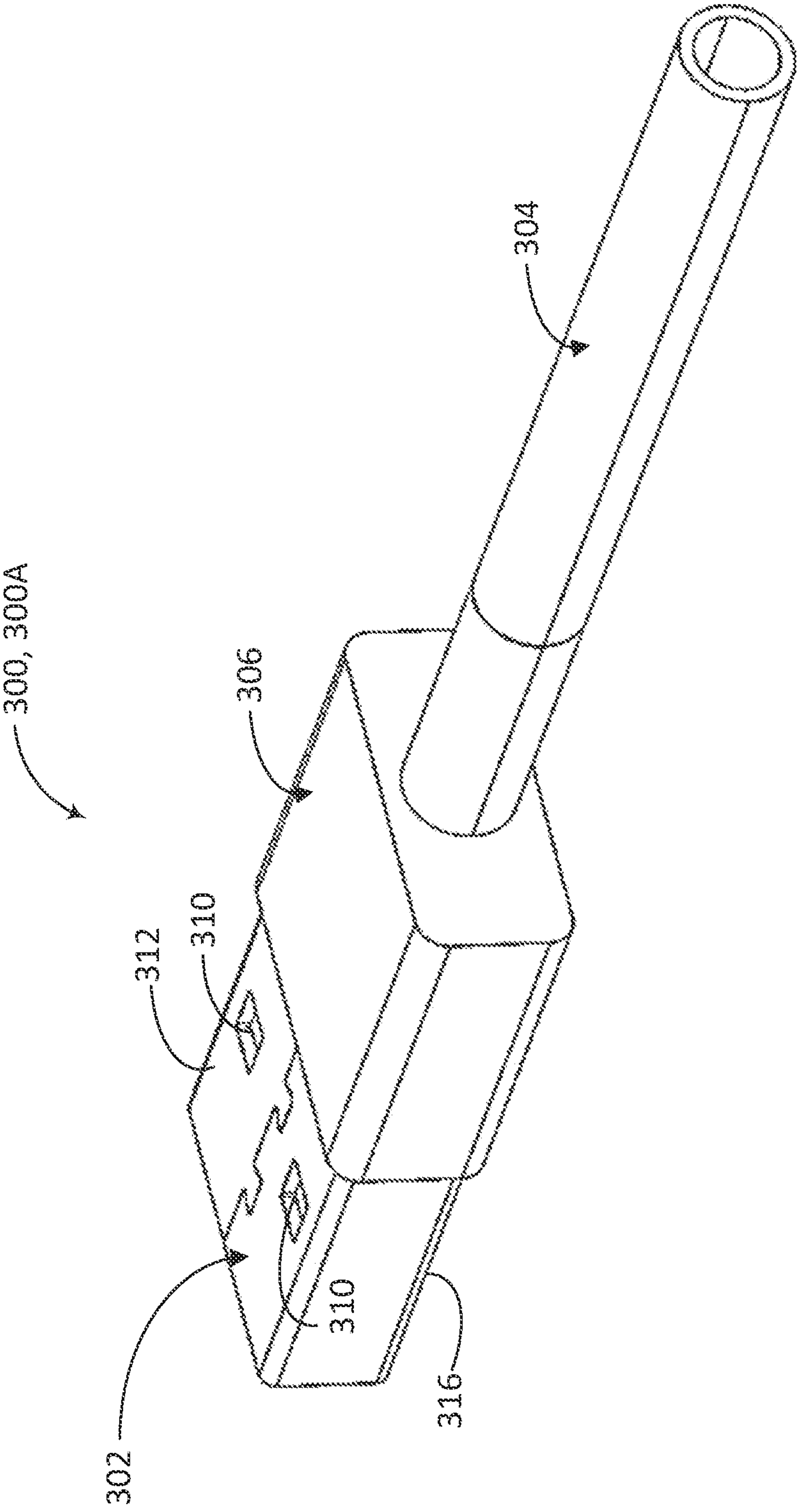
FIG. 3D illustrates an enlarged perspective view of the electronic plug of FIG. 2A according to an example of the present disclosure.

The receptacle 102 may be a standardized component of the electronic port 100, which may be configured to receive and plug to a connector 302 (see, FIG. 3D) of an electronic plug 300 (e.g., a USB plug 300A, see, FIG. 3D). In some examples, the receptacle 102 may be electrically connected and physically coupled to a circuit board 204 (see, FIGS. 2A-2C) among one or more circuit boards disposed within an enclosure 202 (see, FIGS. 2A-2C) of the electronic device 200. In some examples, the receptacle 102 includes a first set of retainer members 106 and a second set of retainer members 108. The first set of retainer members 106 is disposed on a first face 110 of the receptacle 102. The second set of retainer members 108 is disposed on a second face 112 of the receptacle 102. In some examples, each of the first set of retainer members 106 and the second set of retainer members 108 are flexible members, which can be bent along a first direction 10 and a second direction 20, respectively. In the example of FIGS. 1A-1B, each of the first direction 10 and the second direction 20 may be a radial direction of the electronic device 200. In certain examples, the first face 110 and the second face 112 are mutually opposite faces of the receptacle 102. In one or more examples, the first set of retainer members 106 and the second set of retainer members 108 may be configured to releasably hold the connector 302 when the electronic plug 300 is plugged into the electronic port 100. In particular, the first set of retainer members 106 may bend along the first direction 10 and the second set of retainer members 108 may bend along the second direction 20 to hold the connector 302, when the electronic plug 300 is plugged into the electronic port 100. Further, the first set of retainer members 106 may bend along the second direction 20 and the second set of retainer members 108 may bend along the first direction 10 to release the connector 302, when the electronic plug 300 is plugged out of the electronic port 100.

In some examples, the locking assembly 104 may be used to lock the receptacle 102 to prevent removal of the electronic plug 300 from the electronic port 100 or release the receptacle 102 to allow removal of the electronic plug 300 from the electronic port 100. In particular, the locking assembly 104 may be configured to engage with the receptacle 102 to prevent the first set of retainer members 106 to bend along the second direction 20 and the second set of retainer members 108 to bend along the first direction 10 and release the connector 302 from the receptacle 102, thereby preventing the electronic plug 300 being plugged out of the electronic port 100. Similarly, the locking assembly 104 may be configured to disengage from the receptacle 102 to allow the first set of retainer members 106 to bend along the second direction 20 and the second set of retainer members 108 to bend along the first direction 10 and release the connector 302 from the receptacle 102, thereby allowing the electronic plug 300 being plugged out of the electronic port 100. In one or more examples, the locking assembly 104 includes a clamping module 114 and a fastener 116.

The clamping module 114 may be used to engage and/or disengage with the receptacle 102 to prevent and/or release the connector 302 from the receptacle 102. In one or more examples, the clamping module 114 includes a first clamp member 118 and a second clamp member 120.

The first clamp member 118 may be used to engage and/or disengage with the first set of retainer members 106 of the receptacle 102. The first clamp member 118 is defined by a top wall 122, a bottom wall 124, and a pair of support walls 126 extended between the top wall 122 and the bottom wall 124 to define a space 128 therebetween. In some examples, the receptacle 102 and the second clamp member 120 may be positioned in the space 128 defined by the first clamp member 118. The first clamp member 118 includes a first set of engagement members 130 extending from the top wall 122. In some other examples, the first set of engagement members 130 may be discrete members coupled to the top wall 122. In the example of FIGS. 1A-1B, the first set of engagement members 130 includes two numbers of engagement members. In some other examples, the number of engagement members in the first set of engagement members 130 may depend on the number of retainer members in the first set of retainer members 106 of the receptacle 102. The first set of engagement members 130 protrudes along the first direction 10 facing the first face 110 of the receptacle 102. In such examples, the first set of engagement members 130 may align with the first set of retainer members 106. The first clamp member 118 further includes an opening 132 and a guide structure 134 defined in the bottom wall 124. The opening 132 may have threads (not shown) to receive the fastener 116 having counter threads. In the example of FIGS. 1A-1B, the guide structure 134 includes a pair of apertures 136. In some other examples, the guide structure 134 may include protrusions, pillars, flanges, emboss, or the like without limiting the scope of the present disclosure.

The second clamp member 120 may be used to engage and/or disengage with the second set of retainer members 108 of the receptacle 102. The second clamp member 120 is defined by a base portion 138, an elevated portion 140, and an intermediate portion 142 extended between the elevated portion 140 and the base portion 138. In some examples, the elevated portion 140 has a top face 146 that is elevated relative to a top face 139 of the base portion 138 and disposed below and parallel to the second face 112 of the receptacle 102. The elevated portion 140 includes a second set of engagement members 144 extended from a top face 146 of the elevated portion 140. In some other examples, the second set of engagement members 144 may be discrete members coupled to the top face 146 of the elevated portion 140. In the example of FIGS. 1A-1B, the second set of engagement members 144 includes two numbers of engagement members. In some other examples, the number of engagement members in the second set of engagement members 144 may depend on the number of retainer members in the second set of retainer members 108 of the receptacle 102. The second set of engagement members 144 protrudes along the second direction 20 facing the second face 112 of the receptacle 102. In such examples, the second set of engagement members 144 may align with the second set of retainer members 108. The second clamp member 120 further includes a pair of complementary guide structure 148 extended from a bottom face 150 of the base portion 138. In some other examples, the pair of complementary guide structure 148 may be coupled to the bottom face 150 of the base portion 138. Further, in the example of FIGS. 1A-1B, the complementary guide structure 148 includes a pair of protrusions 152. In some other examples, the complementary guide structure 148 may include openings, grooves, or the like without limiting the scope of the present disclosure.

In some examples, the fastener 116 is actuatable along a first actuation direction 30 (e.g., an anti-clockwise direction) or a second actuation direction 40 (e.g., a clockwise direction) to transition the clamping module 114 between the fastened state (see, FIG. 1B) and the unfastened state (see, FIG. 1A) by moving the first clamp member 118 and/or the second clamp member 120 relative to the receptacle 102. In such examples, the fastener 116 drives the first clamp member 118 and/or the second clamp member 120 to engage with and/or disengage from the first set of retainer members 106 and the second set of retainer members 108, respectively. It may be noted herein that occasionally the phrase "and/or" is used herein in conjunction with a list of items. This phrase means that any combination of items in the list from a single item to all of the items and any permutation in between may be included. Thus, for example, "A, B, and/or C" means "one of {A}, {B}, {C}, {A, B}, {A, C}, {C, B}, and {A, C, B}". In some examples, the fastener 116 is a screw 116A, which includes a head portion 154 and a body portion 156. In certain examples, the body portion 156 may include counter treads (not shown) to engage with the threads formed in the opening 132 in the first clamp member 118.

In some examples, the clamping module 114 is defined when the second clamp member 120 is movably coupled to the first clamp member 118. For example, the pair of protrusions 152 of the second clamp member 120 is disposed into the pair of apertures 136 of the first clamp member 118 to movably couple the second clamp member 120 to the first clamp member 118, and thereby define the clamping module 114. Further, the locking assembly 104 is defined when the screw 116A is movably coupled to the first clamp member 118 of the clamping module 114. For example, the fastener 116 is actuated along the first actuation direction 30 into the opening 132 in the first clamp member 118 such that the counter threads in the fastener 116 are engaged with the threads in the opening 132 to movably couple the fastener 116 to the first clamp member 118 until an end 158 of the fastener 116 contacts the second clamp member 120, and thereby define the locking assembly 104. Further, the electronic port 100 is defined when the locking assembly 104 is disposed to contain the receptacle 102. For example, the first clamp member 118 and the second clamp member 120 are positioned around the receptacle 102 such that the first and second sets of engagement members 130, 144 are disposed on opposite sides of the receptacle 102 and are aligned with the first and second sets of retainer members 106, 108, respectively, and thereby defining the electronic port 100. In the example of FIGS. 1A-1B, since the receptacle 102 is physically coupled to the circuit board of the electronic device 200, the first clamp member 118 may be seated on the receptacle 102 due to gravity, such that the first set of engagement members 130 is movably engaged with the first set of retainer members 106.

Further, the fastener 116 is actuated along the first actuation direction 30 to transition the clamping module 114 from the unfastened state to the fastened state. In the example of FIGS. 1A-1B, when the fastener 116 is actuated along the first actuation direction 30, the fastener 116 may drive motion of the second clamp member 120 relative to the first clamp member 118 along a vertical axis 50 in response to motion of the fastener 116 along the vertical axis 50. In such examples, the fastener 116 drives the second clamp member 120 along the second direction 20 until the first set of engagement members 130 is engaged with the first set of retainer members 106, the second set of engagement members 144 is engaged with the second set of retainer members 108, and the first and second sets of engagement members 130, 144, respectively, are separated by a first separation distance "$D_1$". Accordingly, when the fastener 116 is actuated along the first actuation direction 30, the clamping module 114 is transitioned from the unfastened state to the fastened state. In other words, when the fastener 116 is actuated along the first actuation direction 30, the first clamp member 118 remains stationary, while the second clamp member 120 moves along the second direction 20 to transition the clamping module 114 from the unfastened state to the fastened state. In such examples, the first clamp member 118 and the second clamp member 120 are constrained by the fastener 116 to maintain the first separation distance "$D_1$" between the first and second sets of engagement members 130, 144, respectively, and thereby prevent the first and second sets of retainer members 106, 108, respectively, from moving to release the electronic plug 300 from the electronic port.

Similarly, the fastener 116 is actuated along the second actuation direction 40 to transition the clamping module 114 from the fastened state to the unfastened state. In the example of FIGS. 1A-1B, when the fastener 116 is actuated along the second actuation direction 40, the fastener 116 may cause the second clamp member 120 to move along the first direction 10 until the first and second sets of engagement members 130, 144, respectively, are separated by a second separation distance "$D_2$", greater than the first separation distance "$D_1$", which allows the first and second sets of retainer members 106, 108, respectively from moving to release the electronic plug 300 from the electronic port 100. In other words, the first clamp member 118 may remain stationary, while the second clamp member 120 may move along the first direction 10 to transition the clamping module 114 from the fastened state to the unfastened state.

In one or more examples, in the unfastened state, the first set of engagement members 130 is movably engaged with the first set of retainer members 106, whereas the second set of engagement members 144 is not engaged with the second set of retainer members 108, and the first clamp member 118 and the second clamp member 120 are separated by the second separation distance "$D_2$". Accordingly, in the unfastened state, the second clamp member 120 may not constrain the first clamp member 118, thereby allowing the first set of engagement members 130 to move along the second direction 20 when the first pair of retainer members 106 bends along the second direction 20 to release the connector 302 from the receptacle 102.

FIG. 2A depicts an exploded perspective view of an electronic device 200. FIG. 2B depicts an assembled perspective view of the electronic device 200 of FIG. 2A. FIG. 2C depicts a cross-sectional view of the electronic device 200 of FIG. 2B taken along line 1-1' in FIG. 2B. In the description hereinafter, FIGS. 2A-2C are described concurrently for ease of illustration. The electronic device 200 may be a computer (e.g., a server, a storage device), a networking device (e.g., a switch, an access point), or the like. In some examples, the electronic device 200 is an access point 200A. In one or more examples, the electronic device 200 includes an enclosure 202, a circuit board 204, an electronic port 100, and an electronic plug 300.

The enclosure 202 includes a base 206, and may additionally include a cover, a first pair of support walls, and a second pair of support walls (not shown), which are coupled to each other to define an internal volume to host the circuit board 204 and the electronic port 100 therein. It may be noted herein the cover, and the first and second pairs of support walls of the enclosure 202 are not shown in the example of FIGS. 2A-2C for ease of illustration of other components of the electronic device 200, such as the circuit board 204, the electronic port 100, and the electronic plug 300. Accordingly, such non-illustration of the cover, the first and second pairs of support walls of the enclosure 202 should not be construed as a limitation of the present disclosure. Additionally, only a portion of the base 206 is shown in the example of FIGS. 2A-2C, for ease of illustration. The base 206 includes a second guide structure 208 and a second opening 210. In some examples, the second guide structure 208 is a pair of second apertures 212. In some other examples, the second guide structure 208 may include protrusions, pillars, flanges, emboss, or the like without limiting the scope of the present disclosure. The second opening 210 is located between the pair of second apertures 212. In some examples, the second opening 210 does not have threads, and may therefore allow the fastener 116 in the locking assembly 104 of the electronic port 100, having counter threads to freely extend through the second opening 210. In some other examples, the second opening 210 may include threads and in such examples, the fastener 116 having counter threads may engage with the threads in the second opening 210 and extend into the internal volume of the enclosure 202. The base 206 may further include holes (not shown) to enable the circuit board 204 to be physically coupled to the enclosure 202.

In some examples, the circuit board 204 is a primary circuit board of the electronic device 200. In some other examples, the circuit board 204 may be a secondary circuit board, which may be electrically connected to the primary circuit board. In one or more examples, the circuit board 204 is housed within and physically coupled to the enclosure 202. The circuit board 204 includes a substrate 214, one or more processing resources (not shown), e.g., CPU, GPU, or the like disposed on the substrate 214, and traces (not shown) formed in the substrate 214 such that the traces are connected to the one or more processing resources. The substrate 214 may include second holes 216 to enable the circuit board 204 to be coupled to the enclosure 202. In particular, when the circuit board 204 is disposed on the base 206 of the enclosure 202, the second holes 216 in the circuit board 204 may align with the holes in the base 206 of the enclosure 202 to allow pins (not shown) to extend through the second holes 216 and the holes and physically couple the circuit board 204 to the enclosure 202. The substrate 214 further includes slots 218 to enable support elements 160 of the receptacle 102 to extend through the slots 218 and physically couple the receptacle 102 to the circuit board 204. Further, the substrate 214 may include one or more openings (not shown) to enable one or more electrical conductors 162 (see, FIG. 3A) of the receptacle 102 to extend through the one or more openings and electrically connect to the traces formed in the substrate 214.

As discussed hereinabove, the electronic port 100 may be used to communicably connect a communication cable 304 (see, FIG. 3D) of an electronic plug 300 to the circuit board 204 of the electronic device 200. In particular, the electronic plug 300 may be coupled to one end of the communication cable 304 and plugged into the electronic port 100 to communicably connect the communication cable 304 to the circuit board 204 of the electronic device 200. In such examples, a removable electronic device (not shown), e.g., e.g., a cellular modem, a dongle, or the like which may be coupled to other end of the communication cable 304 may be used to perform one or more functions such as storing, processing, receiving, transferring data, or the like with the electronic device 200. The electronic port 100 includes a receptacle 102 and a locking assembly 104.

The receptacle 102 may be a standardized component of the electronic port 100, e.g., the USB port 100A. Referring to Figures, FIG. 3A depicts an enlarged perspective view of the receptacle 102. In some examples, the receptacle 102 includes a first face 110, a second face 112, and a pair of sidewalls 164 extending between the first face 110 and the second face 112 to define a hollow space 174 therein. In some examples, the first face 110 and the second face 112 are opposite faces of the receptacle 102. The first face 110 includes a first set of retainer members 106 and the second face 112 includes a second set of retainer members 108. In some examples, each face of the first face 110 and the second face 112 further includes a set of recesses 166. In such examples, each retainer member of the first set of retainer member 106 and the second set of retainer members 108 extends from a rim 166A of a corresponding recess of the set of recesses 166. Each retainer member of the first set of retainer members 106 and the second set of retainer members 108 is a flexible member. In such examples, each retainer member of the first set of retainer members 106 and the second set of retainer members 108 has a cantilevered structure including a freely suspended portion 168 and a fixed portion 170, which allows the freely suspended portion 168 to bend relative to the fixed portion 170 along a first direction 10 and a second direction 20. Accordingly, each retainer member among the first set of retainer members 106 and the second set of retainer members 108 may bend and releasably hold a connector 302 of the electronic plug 300. The receptacle 102 may further include the support elements 160 each formed at a corresponding end portion of the second face 112, and each protruded into the slots 218 formed in the circuit board 204 to couple the receptacle 102 to the circuit board 204. The receptacle 102 may additionally include a pair of peripheral support elements 172, each disposed on a corresponding sidewall of the pair of sidewalls 164 to provide lateral support to the receptacle 102 within the enclosure 202. The receptacle 102 further includes one or more electrical conductors 162, each extends from a space defined below the second face 112 into the hollow space 174 of the receptacle 102 via a corresponding hole (not labeled) formed in the second face 112 of the receptacle 102. Further, the receptacle 102 includes a complementary connector 176 disposed in the hollow space 174 and coupled to the one or more electrical conductors 162. In some examples, when the electronic plug 300 is plugged into the electronic port 100, the complementary connector 176 of the receptacle 102 receives the connector 302 of the electronic plug 300. In such examples, the complementary connector 176 allows the connector 302 of the electronic plug 300 to be electrically connected to the circuit board 204 via the one or more electrical conductors 162 of the receptacle 102.

The locking assembly 104 may be used to lock the connector 302 of the electronic plug 300 to the receptacle 102 of the electronic port 100 when the electronic plug 300 is plugged into the electronic port 100. In one or more examples, the locking assembly 104 includes a clamping module 114 and a fastener 116.

The clamping module 114 includes a first clamp member 118 and a second clamp member 120. Referring to Figures, FIG. 3B depicts an expanded perspective view of the first clamp member 118. In some examples, the first clamp member 118 includes a top wall 122, a bottom wall 124, and a pair of support walls 126 which are coupled to each other to define a space 128 therebetween. The first clamp member 118 includes a first set of engagement members 130 being coupled to a bottom face 178 of the top wall 122. In some examples, each engagement member of the first set of engagement members 130 has a complementary profile to that of the freely suspended portion 168 of the retainer member of the first set of retainer members 106. In certain examples, each engagement member of the first set of engagement members 130 is an emboss extending from the bottom face 178 of the top wall 122. The first clamp member 118 further includes an opening 132 and a guide structure 134, for example, a pair of apertures 136 formed on the bottom wall 124. In some examples, the opening 132 is a through-opening formed in a protruded ring portion 180 extending between a bottom face 182 and a top face 183 of the bottom wall 124. In some examples, the first clamp member 118 further includes a nut 184 having threads, embedded in the protruded ring portion 180 to allow the fastener 116 having counter threads to engage and extend there through and movably couple with the first clamp member 118. In some examples, the protruded ring portion 180 is formed between the pair of apertures 136. Referring to Figures, FIG. 3C depicts an expanded perspective view of the second clamp member 120. In some examples, the second clamp member 120 includes a base portion 138, an elevated portion 140, and an intermediate portion 142 extending between the elevated portion 140 and the base portion 138. The second clamp member 120 further includes a second set of engagement members 144 coupled to a top face 146 of the elevated portion 140. In some examples, each engagement member of the second set of engagement members 144 has a complementary profile to that of the freely suspended portion 168 of the retainer member of the second set of retainer members 108. In certain examples, each engagement member of the second set of engagement members 144 is an emboss extending from the top face 146 of the elevated portion 140. The second clamp member 120 further includes a complementary guide structure 148, for example, a pair of protrusions 152 coupled to a bottom face 150 of the base portion 138.

Referring to Figures, FIG. 3D depicts an enlarged perspective view of the electronic plug 300 such as a USB plug 300A. The electronic plug 300 includes a connector 302, a communication cable 304, and one or more electrical conductors 308 (see, FIG. 2A). The connector 302 and the communication cable 304 are held together by a mold portion 306 of the electronic plug 300. The mold portion 306 may additionally insulate the one or more electrical conductors 308 of the connector 302 from the surrounding environment. It may be noted herein that the communication cable 304 and the mold portion 306 are not shown in the example of FIGS. 2A-2C for ease of illustration and such non-illustration of the communication cable 304 and the mold portion 306 should not be construed as a limitation of the present disclosure. In one or more examples, the connector 302 is a standardized component of the electronic plug 300. The one or more electrical conductors 308 are electrically connected to the connector 302 and chords (not shown) of the communication cable 304. The connector 302 may be a hollow component configured to receive the complementary connector 176 of the receptacle 102, when the electronic plug 300 is plugged into the electronic port 100. In such examples, the one or more electrical conductors 162 disposed in the receptacle 102 may be electrically connected to the one or more electrical conductors 308 of the connector 302 in the installed state of the electronic plug 300 into the electronic port 100 so as to communicably connect the communication cable 304 to the circuit board 204. In some examples, the connector 302 includes a first set of notches 310 formed on a top face 312 and a second set of notches 314 (see, FIG. 2C) formed on a bottom face 316 of the connector 302. The top face 312 and the bottom face 316 are mutually opposite faces of the connector 302. In one or more examples, when the electronic plug 300 is plugged into the electronic port 100, the first set of notches 310 is aligned to the first set of retainer members 106 and the second set of notches 314 is aligned to the second set of retainer members 108. Accordingly, the first and second sets of retainer members 106, 108 engage with the first and second sets of notches 310, 314, respectively, and releasably hold the connector 302 of the electronic plug 300 to the receptacle 102 of the electronic port 100.

Referring back to the Figures, FIGS. 2B-2C, the circuit board 204 is housed within and coupled to the enclosure 202. The support elements 160 of the receptacle 102 extend through the slots 218 of the circuit board 204 to physically couple the receptacle 102 to the circuit board 204. Further, the one or more electrical conductors 162 of the receptacle 102 extend through the one or more openings of the circuit board 204 to electrically connect to the traces formed in the substrate 214 of the circuit board 204. Further, the pair of protrusions 152 of the second clamp member 120 is disposed into the pair of apertures 136 of the first clamp member 118 to guide motion of the second clamp member 120 along an axis (e.g., a vertical axis 50) relative to the first clamp member 118 and movably couple the second clamp member 120 to the first clamp member 118, and thereby define the clamping module 114. The clamping module 114 is further disposed on the enclosure 202, such that the pair of apertures 136 of the first clamp member 118 is aligned with the pair of second apertures 212 of the enclosure 202 and the opening 132 of the first clamp member 118 is aligned with the second opening 210 of the enclosure 202. In such examples, the pair of protrusions 152 of the second clamp member 120 further protrudes into the pair of second apertures 212 of the enclosure 202 to additionally movably couple the second clamp member 120 to the enclosure 202. In such examples, the top face 139 in the base portion 138 of the second clamp member 120, is disposed parallel to the circuit board 204 of the electronic device 200. Further, the fastener 116 is extended into the volume of the enclosure 202 via the second opening 210. The fastener 116 is further actuated along a first actuation direction 30 (e.g., an anti-clockwise direction) into the opening 132 in the first clamp member 118 such that the counter threads in the fastener 116 are engaged with the threads in the opening 132 to movably couple the fastener 116 to the first clamp member 118 until an end 158 of the fastener 116 contacts the second clamp member 120, and thereby define the locking assembly 104. Further, the first clamp member 118 and the second clamp member 120 are positioned around the receptacle 102 such that the first and second sets of engagement members 130, 144 are disposed on opposite sides of the receptacle 102 and are aligned with the first and second sets of retainer members 106, 108, respectively, and thereby defining the electronic port 100. Since the receptacle 102 is physically coupled to the circuit board 204 of the electronic device 200, the first clamp member 118 may be seated on the receptacle 102 due to gravity, such that the first set of engagement members 130 of the first clamp member 118 is movably engaged with the first set of retainer members 106 of the receptacle 102. However, the second clamp member 120 may be seated on the end 158 of the fastener 116, such that the second set of engagement members 144 of the second clamp member 120 is disengaged from the second set of retainer members 108 of the receptacle 102. In other words, the first and second sets of engagement members 130, 144 are separated by a second separation distance "$D_2$" (see, FIG. 2C).

Further, the electronic plug 300 is connected into the electronic port 100. In particular, the connector 302 of the electronic plug 300 is plugged into the receptacle 102 of the electronic port 100. In such examples, the first set of retainer members 106 moves along the second direction 20 and the second set of retainer members 108 moves along the first direction 10 (as the connector 302 contacts the first and second set of retainer members 106, 108) to allow the connector 302 to be plugged into the receptacle 102. Since the second set of engagement members 144 is not engaged with the second set of retainer members 108, the first and second sets of engagement members 130, 144 does not constrain the first and second sets of retainer members 106, 108 to prevent the first and second sets of retainer members 106, 108 to move along the second direction 20 and the first direction 10, respectively to allow the connector 302 to be plugged into the receptacle 102. Later, the first set of retainer members 106 moves along the first direction 10 to engage with the first set of notches 310, and the second set of retainer members 108 moves along the second direction 20 to engage with the second set of notches 314 and thereby releasably hold the connector 302 to the receptacle 102. Accordingly, in one or more examples, the clamping module 114 in an unfastened state allows the electronic plug 300 to be connected to the electronic port 100.

Figure 4A:
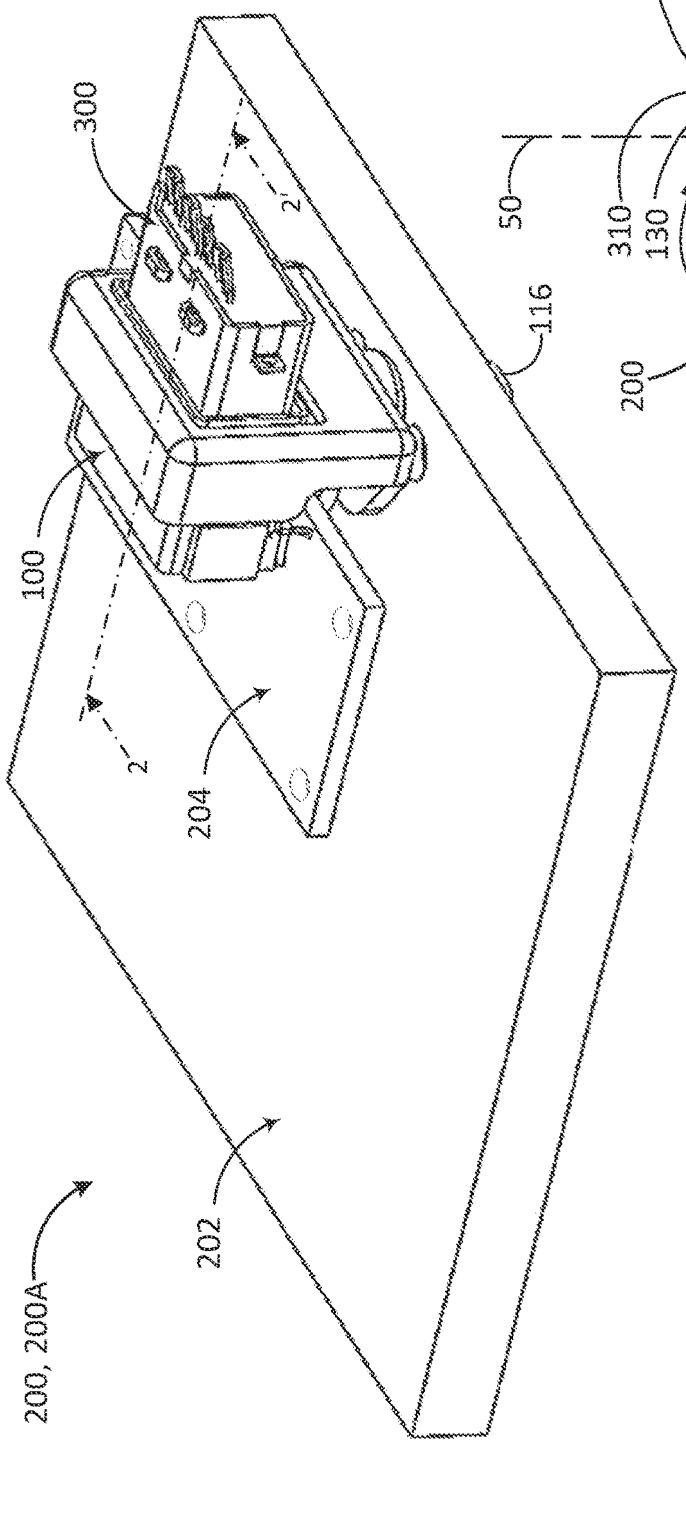
FIG. 4A illustrates an assembled perspective view of the electronic device of FIG. 2A having the electronic plug connected to the electronic port and maintained in a fastened state according to an example of the present disclosure.
Figure 4B:
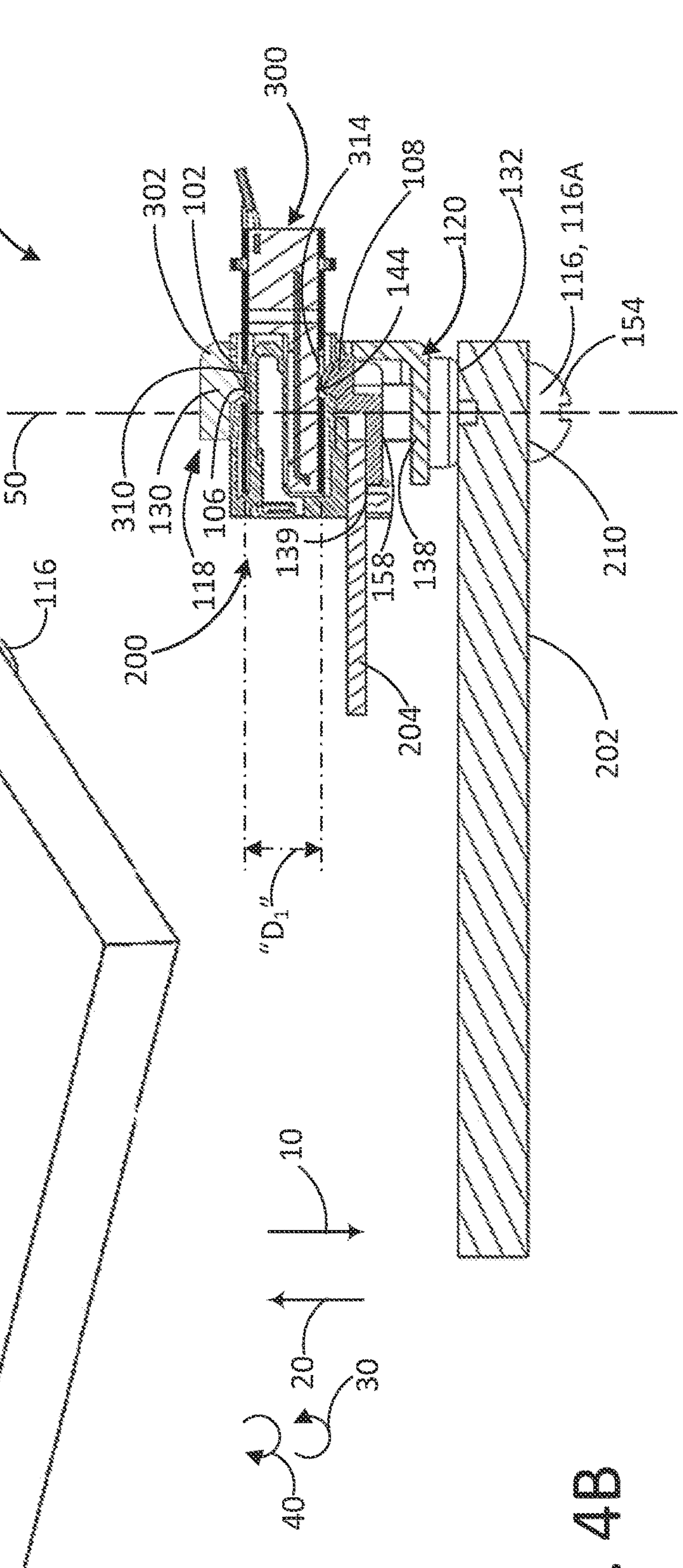
FIG. 4B illustrates a cross-sectional view of the electronic device of FIG. 4A taken along line 2-2' in FIG. 4A and having the electronic port transitioned to a fastened state from the unfastened state according to an example of the present disclosure.

FIG. 4A depicts an assembled perspective view of the electronic device 200 of FIG. 2A having the electronic plug 300 connected to the electronic port 100 and maintained in a fastened state. FIG. 4B depicts a cross-sectional view of the electronic device of FIG. 4A taken along line 2-2' in FIG. 4A and having the electronic port 100 transitioned to a fastened state from the unfastened state. In the description hereinafter, FIGS. 4A-4C are described concurrently for ease of illustration.

In some examples, the fastener 116 is further moved along the first actuation direction 30 to transition the clamping module 114 from the unfastened state to the fastened state. In such examples, when the fastener 116 is actuated along the first actuation direction 30, the fastener 116 moves the second clamp member 120 along the second direction 20 until the first set of engagement members 130 is engaged with the first set of retainer members 106, the second set of engagement members 144 is engaged with the second set of retainer members 108, and the first and second sets of engagement members 130, 144 are separated by a first separation distance "$D_1$". In such examples, the fastener 116 may be actuated until the top face 139 in the base portion 138 of the second clamp member 120 abuts the circuit board 204 and the head 154 of the fastener 116 abuts the enclosure 202. In one or more examples, the fastener 116 constrains the first clamp member 118 and the second clamp member 120 to maintain the first separation distance "$D_1$" between the first and second sets of engagement members 130, 144, and thereby prevent the first and second sets of retainer members 106, 108 from moving to release the electronic plug 300 from the electronic port 100. As discussed herein, the fastener 116 includes a screw 116A that is engaged with threads in the opening 132 of the first clamp member 118 to drive translation of the screw 116A relative to the first clamp member 118 along an axis (e.g., a vertical axis 50) in response to rotation of the screw 116A, and an end 158 of the screw 116A to contact the second clamp member 120 to drive motion of the second clamp member 120 relative to the first clamp member 118 along the vertical axis 50 in the response to motion of the screw 116A along the vertical axis 50. Accordingly, in the fastened state, the first and second sets of engagement members 130, 144 engage the first and second sets of retainer members 106, 108, respectively, and prevent the first and second sets of retainer members 106, 108 from releasing the connector 302 from the receptacle 102.

In some examples, referring back to FIGS. 2C, the fastener 116 is further moved in a second actuation direction 40 (e.g., a clockwise direction) to transition back the clamping module 114 to the unfastened state from the fastened state. In such examples, when the fastener 116 is actuated along the second actuation direction 40, the fastener 116 allows the second clamp member 120 to move (e.g., drop by gravity) along the first direction 10 until the second set of engagement members 144 is separated from the second set of retainer members 108 and the first and second sets of engagement members 130, 144, respectively, are separated by the second separation distance "$D_2$", greater than the first separation distance "$D_1$", and thereby allowing the first and second sets of retainer members 106, 108 from moving to release the electronic plug 300 from the electronic port 100. Accordingly, in the unfastened state, the second set of engagement members 144 disengages from the second set of retainer members 108 and allow the first and second sets of retainer members 106, 108 to release the connector 302 from the receptacle 102.

Figure 5B:
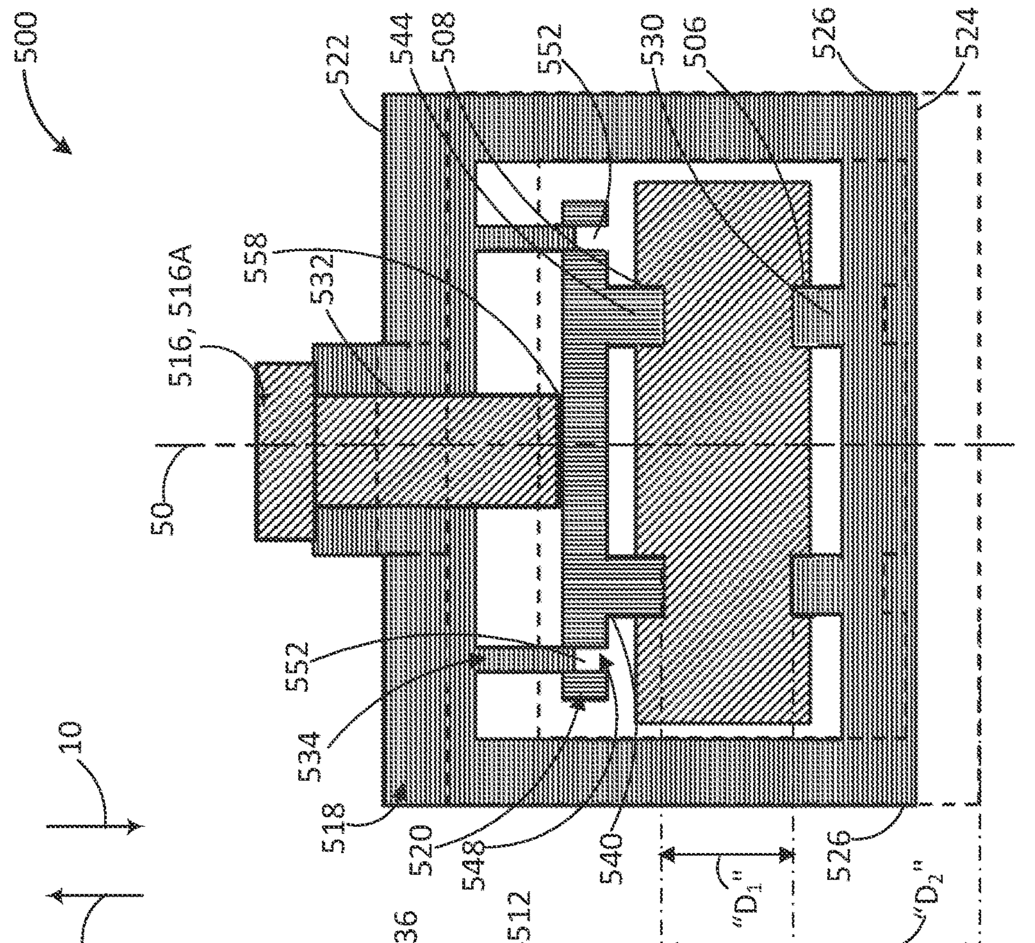
FIG. 5B illustrates the block diagram of the electronic port of FIG. 5A transitioned to a fastened state from the fastened state according to yet another example of the present disclosure.
Figure 5A:
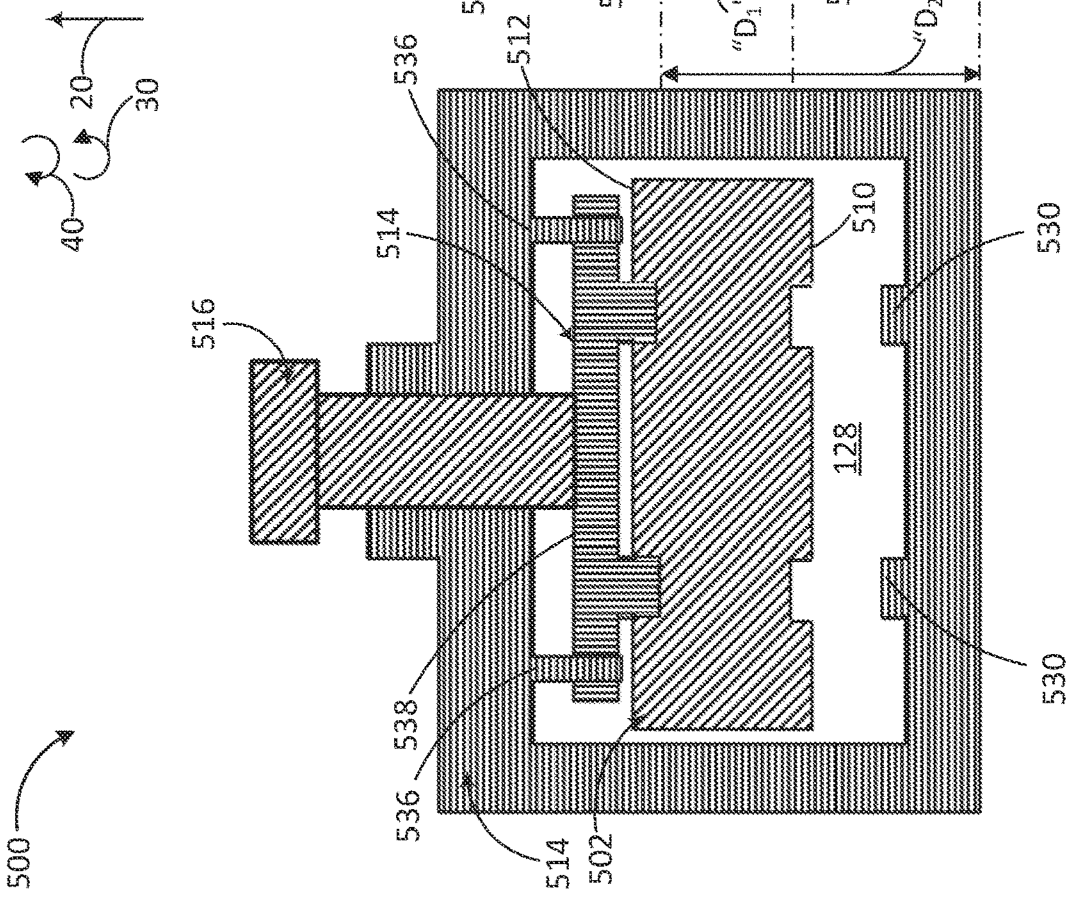
FIG. 5A illustrates a block diagram of an electronic port maintained in an unfastened state according to yet another example of the present disclosure.

FIG. 5A depicts a block diagram of an electronic port 500 maintained in an unfastened state. FIG. 5B depicts the block diagram of the electronic port 500 of FIG. 5A transitioned to a fastened state from the fastened state. In the description hereinafter, FIGS. 4A-4C are described concurrently for ease of illustration.

The electronic port 500 includes a receptacle 502 and a locking assembly 504. In some examples, the receptacle 502 includes a first set of retainer members 506 and a second set of retainer members 508. The first set of retainer members 506 is formed on a first face 510 of the receptacle 502 and the second set of retainer members 508 is formed on a second face 512 opposite to that of the first face 510 of the receptacle 502. The locking assembly 504 includes a clamping module 514 and a fastener 516. The clamping module 514 includes a first clamp member 518 and a second clamp member 520. The first clamp member 518 is defined by a top wall 522, a bottom wall 524, and a pair of sidewalls 526 coupled to each other to define a space 528 there between. In some examples, the top wall 522 of the first clamp member 518 includes an opening 532 and a guide member 534, e.g., a pair of protrusions 536, and the bottom wall 524 of the first clamp member 518 includes a first set of engagement members 530. Similarly, the second clamp member 520 includes an elevated portion 540 having a second set of engagement members 544, a base portion 538 having a second guide member 548, e.g., a pair of apertures 552, and an intermediate portion connecting the base portion 538 to the elevated portion 540. In some examples, the second clamp member 520 is disposed in the space 528 and movably coupled with the first clamp member 518. For example, the pair of protrusions 536 extends into the pair of apertures 552 to movably couple the second clamp member 520 to the first clamp member 518. Further, the clamping module 514 is disposed around the receptacle 502 such that the receptacle 502 is positioned in the space 528 and the first and second sets of engagement members 530, 544 are disposed on opposite sides of the receptacle 502 and are aligned with the first and second sets of retainer members 506, 508, respectively. In one or more examples, the fastener 516 is movably coupled to the clamping module 514. For example, the fastener 516 extends into the opening 532 formed in the top wall 522 of the first clamp member 518 until an end 558 of the fastener 516 contacts the second clamp member 520 to movably couple to the clamping module 514. In one or more examples, the fastener 516 is configured to, when actuated, transition the clamping module 514 between a fastened state (see, FIG. 5B) and an unfastened state (see, FIG. 5A) by moving the first clamp member 518 relative to the receptacle 502. In the example of FIGS. 5A-5B, the second clamp member 520 is seated on the receptacle 502 due to gravity, such that the second set of engagement members 544 is movably engaged with the second set of retainer members 508.

Further, the fastener 516 is actuated along a second actuation direction 40 (e.g., a clockwise direction) to transition the clamping module 514 from the unfastened state to the fastened state. In the example of FIGS. 5A-5B, when the fastener 516 is actuated along the second actuation direction 40, the fastener 516 may drive motion of the second clamp member 520 relative to the first clamp member 518 along a vertical axis 50 in response to motion of the fastener 516 along the vertical axis 50. In such examples, the fastener 516 drives the first clamp member 518 along the second direction 20 until the first set of engagement members 530 is engaged with the first set of retainer members 506, the second set of engagement members 544 is engaged with the second set of retainer members 508, and the first and second sets of engagement members 530, 544, respectively, are separated by a first separation distance "$D_1$". Accordingly, when the fastener 516 is actuated along the second actuation direction 40, the clamping module 514 is transitioned from the unfastened state to the fastened state. In other words, when the fastener 516 is actuated along the second actuation direction 40, the second clamp member 520 remains stationary, while the first clamp member 518 moves along the second direction 20 to transition the clamping module 514 from the unfastened state to the fastened state. In such examples, the first clamp member 518 and the second clamp member 520 are constrained by the fastener 516 to maintain the first separation distance "$D_1$" between the first and second sets of engagement members 530, 544, respectively, and thereby prevent the first and second sets of retainer members 506, 508, respectively, from moving to release an electronic plug from the electronic port 500.

Similarly, the fastener 516 is actuated along the first actuation direction 30 (e.g., an anti-clockwise direction) to transition the clamping module 514 from the fastened state to the unfastened state. In the example of FIGS. 5A-5B, when the fastener 516 is actuated along the first actuation direction 30, the fastener 516 may cause the first clamp member 518 to move along the first direction 10 until the first and second sets of engagement members 530, 544, respectively, are separated by a second separation distance "$D_2$", greater than the first separation distance "$D_1$", which allows the first and second sets of retainer members 506, 508, respectively from moving to release the electronic plug from the electronic port 500. In other words, the second clamp member 520 may remain stationary, while the first clamp member 518 may move along the first direction 10 to transition the clamping module 514 from the fastened state to the unfastened state. As discussed herein, the fastener 516 includes a screw 516A that is engaged with threads in the opening 532 of the first clamp member 518 and the end 558 of the screw 516A that contacts the second clamp member 520 to drive motion of the first clamp member 518 relative to the second clamp member 520 along the vertical axis 50 in response to motion of the screw 516A along the vertical axis 50.

In one or more examples, in the unfastened state, the second set of engagement members 544 is movably engaged with the second set of retainer members 508, whereas the first set of engagement members 530 is not engaged with the first set of retainer members 506, and the first clamp member 518 and the second clamp member 520 are separated by the second separation distance "$D_2$". Accordingly, in the unfastened state, the first clamp member 518 may not constrain the second clamp member 520, thereby allowing the second set of engagement members 144 to move along the second direction 20 when the second pair of retainer members 508 bends along the second direction 20 to release the connector from the receptacle 502.

Figure 6:
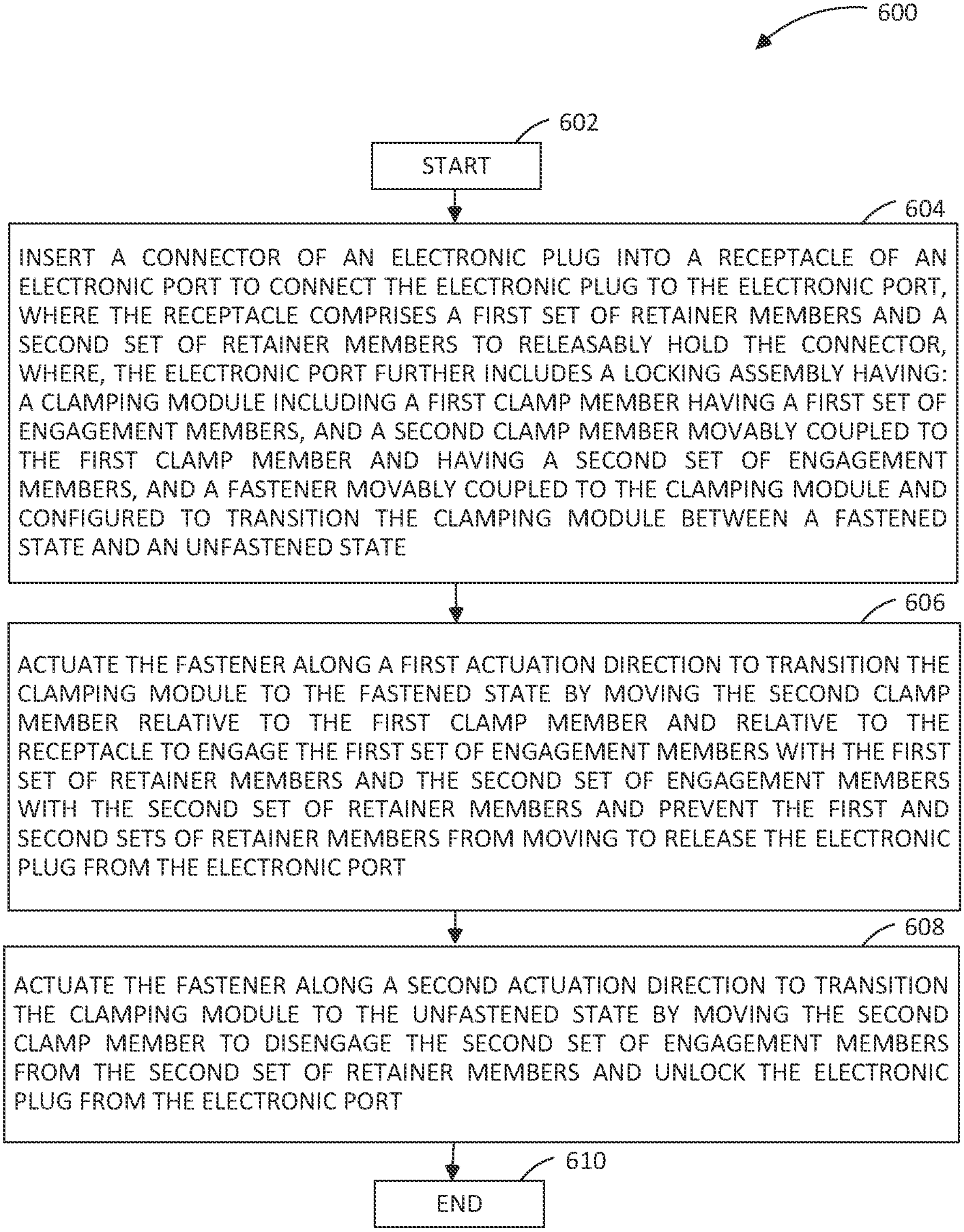
FIG. 6 is a flowchart depicting a method of locking an electronic plug to an electronic port using a locking assembly according to one example of the present disclosure.

FIG. 6 depicts a flowchart depicting a method 600 of locking an electronic plug to an electronic port using a locking assembly of the electronic port. It may be noted herein that the method 600 is described in conjunction with FIGS. 1A-1B, 2A-2C, 3A-3D, and 4A-4B for example. The method 600 starts at block 602 and continues to block 604.

At block 604, the method 600 includes inserting a connector of an electronic plug into a receptacle of an electronic port to connect the electronic plug to the electronic port, where the receptacle includes a first set of retainer members and a second set of retainer members to releasably hold the connector. In some examples, the electronic port further includes a locking assembly having: a clamping module including a first clamp member having a first set of engagement members, and a second clamp member movably coupled to the first clamp member and having a second set of engagement members, and a fastener movably coupled to the clamping module and configured to transition the clamping module between a fastened state and an unfastened state. The method 600 continues to block 606.

At block 606, the method 600 includes actuating the fastener along a first actuation direction to transition the clamping module to the fastened state by moving the second clamp member relative to the first clamp member and relative to the receptacle to engage the first set of engagement members with the first set of retainer members and the second set of engagement members with the second set of retainer members and prevent the first and second sets of retainer members from moving to release the electronic plug from the electronic port. The method 600 continues to block 608.

At block 608, the method 600 further includes actuating the fastener along a second actuation direction to transition the clamping module to the unfastened state by moving the second clamp member to disengage the second set of engagement members from the second set of retainer members and unlock the electronic plug from the electronic port. The method 600 ends at block 610.

Since the engagement members are configured to engage with internal components, e.g., retainer members of the receptacle to prevent the release of the connector of the electronic plug, the locking assembly may occupy substantially less space of the electronic device when compared to an external locking device used for securing the USB plug. Accordingly, the locking assembly having such simple design may be self-contained and does not require additional components external to the USB port, thus allowing the cost to secure the removable electronic module in the electronic device to be substantially low. Further, since both first and second sets of retainer members are engaged by the first and second sets of engagement members of the locking assembly, the amount of force that may be required for a forced removal (or theft) of the removal electronic device from the electronic device may be substantially high, e.g., greater than 130N (which may be more than an average force that a human may apply), thereby securing the USB plug to the USB port.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. An electronic port comprising:

a receptacle comprising a first set of retainer members on a first face of the receptacle and a second set of retainer members on a second face of the receptacle opposite from the first face, the first and second sets of retainer members being configured to releasably hold a connector of an electronic plug; and a locking assembly comprising:

a clamping module comprising a first clamp member having a first set of engagement members, and a second clamp member movably coupled to the first clamp member and having a second set of engagement members, wherein the first and second sets of engagement members are disposed on opposite sides of the receptacle and are aligned with the first and second sets of retainer members, respectively; and a fastener movably coupled to the clamping module, wherein the fastener is configured to, when actuated, transition the clamping module between a fastened state and an unfastened state by moving the first clamp member and/or the second clamp member relative to the receptacle, wherein in the unfastened state, the first and second sets of retainer members are allowed to release the connector, and wherein in the fastened state, the first and second sets of engagement members engage the first and second sets of retainer members, respectively, and prevent the first and second sets of retainer members from releasing the connector.

2. The electronic port of claim 1, wherein the fastener is actuatable in a first actuation direction to transition the clamping module to the fastened state by:

moving the first clamp member along a first direction and/or moving the second clamp member along a second direction opposite the first direction until the first set of engagement members is engaged with the first set of retainer members, the second set of engagement members is engaged with the second set of retainer members, and the first and second sets of engagement members are separated by a first separation distance; and constraining the first and second clamp members to maintain the first separation distance between the first and second sets of engagement members, and thereby preventing the first and second sets of retainer members from moving to release the electronic plug from the electronic port.

3. The electronic port of claim 2, wherein, the fastener is actuatable in a second actuation direction to transition the clamping module to the unfastened state by moving the first clamp member along the second direction and/or moving the second clamp member along the first direction until the first and second sets of engagement members are separated by a second separation distance, greater than the first separation distance, which allows the first and second sets of retainer members from moving to release the electronic plug from the electronic port.

4. The electronic port of claim 1, wherein the first clamp member comprises:

a top wall disposed above the first face of the receptacle, the first set of engagement members being coupled to the top wall and facing the first set of retainer members;

a bottom wall disposed below the second face of the receptacle and comprising an opening through which the fastener extends to movably couple the fastener to the clamping module; and a pair of support walls extended between the bottom wall and the top wall to define a space therebetween in which the receptacle and the second clamp member are positioned.

5. The electronic port of claim 4, wherein the first clamp member comprises a guide structure that engages with the second clamp member to guide motion of the second clamp member along an axis relative to the first clamp member and movably couple the second clamp member to the first clamp member.

6. The electronic port of claim 5, wherein the guide structure comprises a pair of apertures in one of the top wall or the bottom wall of the first clamp member and the second clamp member comprises a pair of protrusions that extends into the pair of apertures.

7. The electronic port of claim 4, wherein the second clamp member comprises:

a base portion having a top face parallel to a circuit board of an electronic device and a bottom face;

an elevated portion having a top face that is elevated relative to the top face of the base portion and disposed below and parallel to the second face of the receptacle, the second set of engagement members being coupled to the top face of the elevated portion and facing the second set of retainer members;

an intermediate portion extending between the elevated portion and the base portion; and a pair of protrusions coupled to the bottom face of the base portion, wherein in the fastened state, the circuit board abuts the top face of the base portion.

8. The electronic port of claim 4, wherein the fastener comprises a screw that is engaged with threads in the opening of the first clamp member to drive translation of the screw relative to the first clamp member along a vertical axis in response to rotation of the screw, and an end of the screw to contact the second clamp member to drive motion of the second clamp member relative to the first clamp member along the vertical axis in the response to motion of the screw along the vertical axis.

9. The electronic port of claim 4, wherein the fastener comprises a screw that is engaged with threads in the opening of the first clamp member and an end of the screw that contacts the second clamp member to drive motion of the first clamp member relative to the second clamp member along a vertical axis in response to motion of the screw along the vertical axis.

10. The electronic port of claim 1, wherein the electronic port is a universal serial bus (USB) port.

11. An electronic device comprising:

an enclosure;

one or more circuit boards housed within and coupled to the enclosure;

an electronic port coupled to one of the circuit boards, comprising:

a receptacle configured to receive an electronic plug of a communication cable, the receptacle comprising a first set of retainer members on a first face of the receptacle and a second set of retainer members on a second face of the receptacle opposite from the first face, wherein the first and second sets of retainer members of the receptacle are configured to releasably hold a connector of the electronic plug in an installed state of the electronic plug to the electronic port;

one or more electrical conductors disposed in the receptacle and configured to electrically connect with the connector of the electronic plug in the installed state of the electronic plug in the electronic port to communicably connect the communication cable to one of the circuit boards; and a locking assembly comprising:

a clamping module comprising a first clamp member having a first set of engagement members, and a second clamp member movably coupled to the first clamp member and the enclosure, and having a second set of engagement members, wherein the first and second sets of engagement members are disposed on opposite sides of the receptacle and are aligned with the first and second sets of retainer members, respectively; and a fastener movably coupled to the clamping module, wherein the fastener, when actuated, transitions the clamping module between a fastened state and an unfastened state by moving at least the second clamp member relative to the receptacle, wherein, in the unfastened state, the first and second sets of engagement members allow the first and second sets of retainer members to release the connector, and wherein, in the fastened state, the first and second sets of engagement members engage the first and second sets of retainer members, respectively, and prevent the first and second sets of retainer members from releasing the connector.

12. The electronic device of claim 11, wherein the fastener is actuatable in a first actuation direction to transition the clamping module to the fastened state by:

moving the first clamp member along a first direction and/or moving the second clamp member along a second direction opposite the first direction until the first set of engagement members is engaged with the first set of retainer members, the second set of engagement members is engaged with the second set of retainer members, and the first and second sets of engagement members are separated by a first separation distance; and constraining the first and second clamp members to maintain the first separation distance between the first and second sets of engagement members, and thereby preventing the first and second sets of retainer members from moving to release the electronic plug from the electronic port.

13. The electronic device of claim 12, wherein, the fastener is actuatable in a second actuation direction to transition the clamping module to the unfastened state by moving the first clamp member along the second direction and/or moving the second clamp member along the first direction until the first and second sets of engagement members are separated by a second separation distance, greater than the first separation distance, which allows the first and second sets of retainer members from moving to release the electronic plug from the electronic port.

14. The electronic device of claim 11, wherein the first clamp member comprises:

a top wall disposed above the first face of the receptacle, the first set of engagement members being coupled to the top wall and facing the first set of retainer members;

a bottom wall disposed below the second face of the receptacle and comprising an opening through which the fastener extends to movably couple the fastener to the clamping module; and a pair of support walls extended between the bottom wall and the top wall to define a space therebetween in which the receptacle and the second clamp member are positioned.

15. The electronic device of claim 14, wherein the first clamp member comprises a guide structure and the enclosure comprises a second guide structure aligned with the guide structure, and wherein the guide structure and the second guide structure engage with the second clamp member to guide motion of the second clamp member along an axis relative to the first clamp member and the enclosure, and movably couple the second clamp member to the first clamp member and the enclosure.

16. The electronic device of claim 15, wherein the guide structure comprises a pair of apertures in one of the top wall or the bottom wall of the first clamp member, wherein the second guide structure comprises a pair of second apertures, and wherein the second clamp member comprises a pair of protrusions that extends into the pair of apertures and the pair of second apertures.

17. The electronic device of claim 14, wherein the second clamp member comprises:

a base portion having a top face parallel to one of the circuit boards and a bottom face;

an elevated portion having a top face that is elevated relative to the top face of the base portion and disposed below and parallel to the second face of the receptacle, the second set of engagement members being coupled to the top face of the elevated portion and facing the second set of retainer members;

an intermediate portion extending between the elevated portion and the base portion; and a pair of protrusions coupled to the bottom face of the base portion, wherein in the fastened state, one of the circuit boards abuts the top face of the base portion.

18. The electronic device of claim 11, wherein the electronic port is a universal serial bus (USB) port, and the electronic plug is a USB plug.

19. A method comprising:

inserting a connector of an electronic plug into a receptacle of an electronic port to connect the electronic plug to the electronic port, where the receptacle comprises a first set of retainer members and a second set of retainer members to releasably hold the connector, wherein the electronic port further comprises a locking assembly comprising: a clamping module including a first clamp member having a first set of engagement members, and a second clamp member movably coupled to the first clamp member and having a second set of engagement members, and a fastener movably coupled to the clamping module and configured to transition the clamping module between a fastened state and an unfastened state; and actuating the fastener along a first actuation direction to transition the clamping module to the fastened state by moving the second clamp member relative to the first clamp member and relative to the receptacle to engage the first set of engagement members with the first set of retainer members and the second set of engagement members with the second set of retainer members and prevent the first and second sets of retainer members from moving to release the electronic plug from the electronic port.

20. The method of claim 19, further comprising actuating the fastener along a second actuation direction to transition the clamping module to the unfastened state by moving the second clamp member to disengage the second set of engagement members from the second set of retainer members and unlock the electronic plug from the electronic port.

* * * * *